US006726292B1

(12) United States Patent
Schroeder et al.

(10) Patent No.: US 6,726,292 B1
(45) Date of Patent: Apr. 27, 2004

(54) FULL OFF-SET TWO-PIECE FIBER REINFORCED COMPOSITE WHEEL USING SPOKE OR WEB AREA BOX SECTIONS

(75) Inventors: Del C Schroeder, Bloomfield Hills, MI (US); John G Argeropoulos, Sterling Heights, MI (US); Jeremy A Panasiewicz, Pontiac, MI (US); David J Hunter, Clawson, MI (US); David G Speth, Sylvan Lake, MI (US); Suresh Nagesh, West Bloomfield, MI (US)

(73) Assignee: DaimlerChrysler Corporation, Auburn Hills, MI (US)

(*) Notice: Subject to any disclaimer, the term of this patent is extended or adjusted under 35 U.S.C. 154(b) by 0 days.

(21) Appl. No.: 09/626,810

(22) Filed: Jul. 27, 2000

(51) Int. Cl.[7] .......... B60B 5/02

(52) U.S. Cl. .......... 301/64.704; 301/64.101; 301/64.706; 301/104

(58) Field of Search .......... 301/64.7, 64.1, 301/64.2, 64.3, 64.4, 65, 104, 64.101, 64.102, 64.201, 64.203, 64.704, 64.705, 64.706, 64.5, 79, 64.202

(56) References Cited

U.S. PATENT DOCUMENTS

| | | | | | |
|---|---|---|---|---|---|
| 978,516 | A | * | 12/1910 | Turner | 301/64.2 |
| 1,071,099 | A | * | 8/1913 | Schwene | 301/64.2 |
| 1,078,581 | A | * | 11/1913 | Horn et al. | 301/64.2 |
| 1,102,193 | A | * | 6/1914 | Horn et al. | 301/64.2 |
| 1,156,486 | A | * | 10/1915 | Krebs | 301/64.2 |
| 1,269,172 | A | * | 6/1918 | Forsyth | 301/11.1 |
| 1,305,820 | A | * | 6/1919 | Macbeth | 301/12.1 |
| 1,354,221 | A | * | 9/1920 | Shoemaker | 301/64.201 |
| 1,422,167 | A | * | 7/1922 | Barry | 301/64.201 |
| 1,446,138 | A | * | 2/1923 | Thompson | 301/64.2 |
| 1,470,742 | A | * | 10/1923 | Ibach | 301/64.2 |
| 1,610,023 | A | * | 12/1926 | Meldrum | 301/65 |

(List continued on next page.)

FOREIGN PATENT DOCUMENTS

| | | | | |
|---|---|---|---|---|
| CA | 628786 | * | 10/1961 | 301/64.7 |
| DE | 158834 | * | 6/1905 | 301/64.2 |
| DE | 2651-178 | * | 7/1978 | 301/64.7 |
| DE | 3620-097 | * | 12/1987 | 301/64.7 |
| FR | 522522 | * | 7/1921 | 301/64.2 |
| GB | 293497 | * | 7/1928 | 301/64.2 |
| GB | 885675 | * | 12/1961 | 301/64.7 |
| GB | 1033377 | * | 6/1966 | 301/64.7 |
| JP | 58-122201 | * | 7/1983 | 301/64.7 |
| JP | 59-32502 | * | 2/1984 | 301/64.2 |
| JP | 59-195403 | * | 11/1984 | 301/64.7 |
| JP | 5-77602 | * | 3/1993 | 301/64.7 |
| WO | WO 02/20252 A1 | | 3/2002 | |

*Primary Examiner*—S. Joseph Morano
*Assistant Examiner*—Ajay Vasudeva
(74) *Attorney, Agent, or Firm*—Ralph E. Smith

(57) ABSTRACT

A two piece fiber reinforced composite wheel includes a molded inner rim portion defining an outboard engagement surface and a molded outer rim portion defining an inboard engagement surface. The inner and outer rim portions are conformed so as to interlock together and are adhesively bonded. The inner and outer rim portions engage forming a plurality of spoke sections having substantially box shaped cross sections. The spoke sections are further connected with fasteners.

25 Claims, 4 Drawing Sheets

50 57 29 27 20 10 29 27 9 29 27 9 50 20

U.S. PATENT DOCUMENTS 1,635,490 A * 7/1927 Meldrum ..................... 301/65
1,684,552 A * 9/1928 Meldrum ..................... 301/65
2,544,387 A * 3/1951 Kerr ............................ 301/65
3,253,862 A * 5/1966 Watanabe et al. ............. 301/65
3,357,747 A 12/1967 Eldred
3,695,728 A * 10/1972 Haussels .................... 301/64.3
3,811,737 A 5/1974 Lejeune
3,862,779 A * 1/1975 Jayne ........................ 301/64.3
4,072,358 A 2/1978 Ridha
4,114,953 A * 9/1978 Baumgartner .............. 301/64.2
4,173,992 A * 11/1979 Lejeune ................... 152/381.3
4,294,490 A * 10/1981 Woelfel ..................... 301/64.7
4,483,729 A * 11/1984 Fujisaki et al. ............. 156/222
4,511,184 A * 4/1985 Schauf et al. .......... 301/64.704
4,527,839 A * 7/1985 Fujitaka et al. ............ 301/64.2
4,573,745 A * 3/1986 Fujisaki et al. ............ 301/64.7
4,636,344 A * 1/1987 McDougall ................. 264/102
4,721,342 A 1/1988 Daniels et al.
4,741,578 A * 5/1988 Viellard ................. 301/64.704
4,832,414 A 5/1989 Jones
4,900,095 A 2/1990 Brubaker
5,018,795 A 5/1991 Engerand et al.
5,045,261 A 9/1991 Weeks
5,133,591 A * 7/1992 Skaggs et al. ............. 301/64.3
5,234,259 A 8/1993 Nishimuro et al.
5,268,139 A 12/1993 Sheeler
5,277,479 A * 1/1994 Koyama et al. ....... 301/64.703
5,362,134 A 11/1994 Carmona
5,564,793 A * 10/1996 Whiteford .............. 301/64.703
5,762,405 A 6/1998 Dempsey
5,782,540 A * 7/1998 Camfield et al. .......... 301/64.4
5,826,948 A 10/1998 Schroeder et al.
5,918,947 A * 7/1999 Stach et al. ................... 301/65
5,985,072 A * 11/1999 Finck et al. ................ 156/184
6,095,543 A 8/2000 McMahon et al.

* cited by examiner

FULL OFF-SET TWO-PIECE FIBER REINFORCED COMPOSITE WHEEL USING SPOKE OR WEB AREA BOX SECTIONS

FIELD OF THE INVENTION

The present invention relates generally to automobile wheels, and more particularly to injection molded plastic composite automobile wheels.

BACKGROUND

The automotive industry has increasingly been motivated to provide automobiles with decreased mass. A general trend toward more fuel efficient vehicles has influenced automobile manufacturers to develop more economical, light weight vehicle components. In order to produce vehicles which are lighter and less expensive there has been a strong movement in the automotive industry to develop vehicle body components which have been molded from plastic.

The present invention recognizes that the cost of an automobile can be reduced by minimizing the weight of its wheels. The cost of a lightweight automobile is relatively low because, among other things, a lightweight automobile can be propelled by a relatively small fuel-efficient power plant. Additionally, certain lightweight materials happen to be inexpensive, and easy to manufacture.

Furthermore, the present invention recognizes that still further weight and cost savings would accrue from using plastic composite as the material for the wheels. More particularly, the reduced weight of plastic wheels may make it possible to incorporate a comparatively simplified, cost effective, lighter weight suspension system because of the less unsprung wheel mass.

Although plastic compostite wheels represent substantial benefits, they also present a common drawback of having decreased structural strength. More specifically the compression strength generally is reduced from conventional steel or alloy wheel rims. In order to overcome this problem, it is necessary to provide a reinforced plastic wheel capable of increased structural strength.

SUMMARY OF THE INVENTION

It is an object of the present invention to provide a two piece structural fiber reinforced composite wheel.

It is yet another object of the present invention to provide a lightweight automobile wheel that has radial spoke sections that have substantially box shaped cross sections.

A further object of the present invention is to provide a lightweight automobile wheel that meets wheel durability and serviceability requirements under heavy structural loading.

Still another object of the present invention is to provide a lightweight automobile wheel which is simple in structure, inexpensive to manufacture and refined in appearance.

These and other objects of the present invention are obtained by providing a lightweight automobile wheel which includes an outboard unitary composite wheel rim which defines an inboard oriented engagement surface. Additionally, the wheel includes an inboard unitary composite wheel rim that defines an outboard oriented engagement surface which is formed for mating with the inboard oriented engagement surface.

In the preferred embodiment, a plurality of fasteners are engaged with the rims within the spoke sections for holding the rims together. The rims are also held together by an adhesive. The inboard composite wheel rim and the outboard composite wheel rim engage such that the adhesive provides an air tight seal between the two rims making it suitable to accept a tire. The spoke sections join at a central disc-shaped portion having apertures suitably incorporated to engage a wheel hub member. Reinforcing wall portions are incorporated in the spoke sections for structural support.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 5:
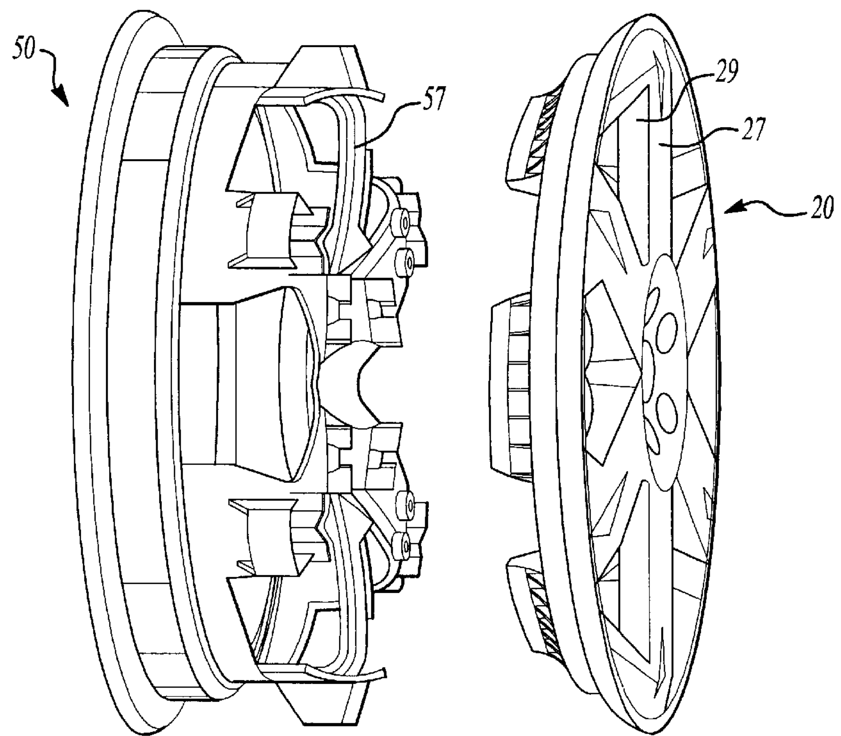
FIG. 5 is a perspective view of the inboard and outboard rim sections aligned prior to engagement.

The present invention provides a two piece composite wheel. With reference to the drawings, the two piece composite wheel constructed in accordance to the teachings of the present invention is illustrated and identified with reference numeral 10. More specifically, the two piece composite wheel 10 includes an outboard composite rim 20 and an inboard composite rim 50, as shown in FIG. 5. The outboard composite rim 20 and inboard composite rim 50 are both molded of fiber reinforced plastic. One process for creating the fiber reinforced plastic includes injection molding or compression molding around a structural fiber material residing in the mold. The structural fiber material is preformed to encourage repeatable results and may include carbon, fiberglass, KEVLAR, nylon, mesh polymer or the like. The structural fiber material can also comprise a screen-like, woven material or a loose fiber configuration.

Figure 1:
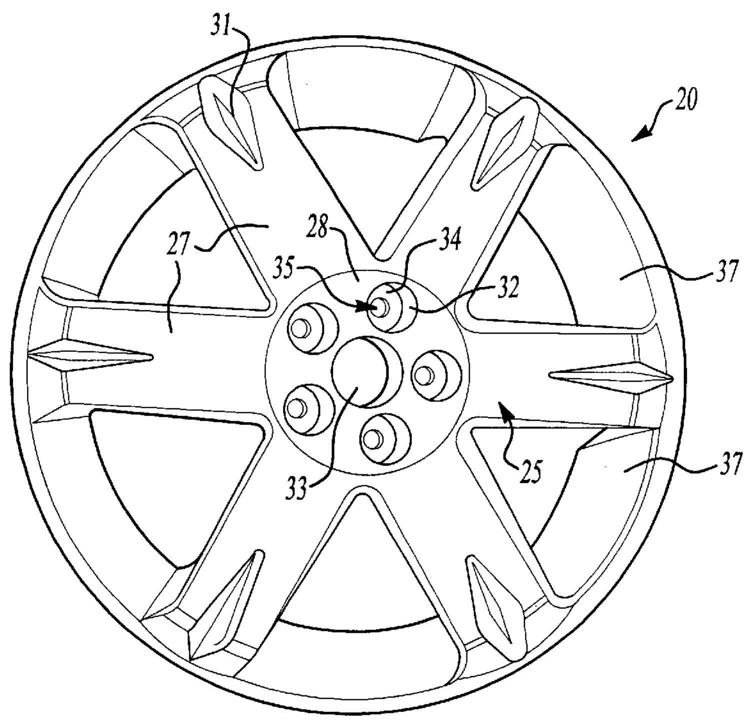
FIG. 1 is a perspective view of the outboard surface of the outboard unitary composite wheel rim constructed in accordance with the teachings of the preferred embodiment of the present invention.
Figure 2:
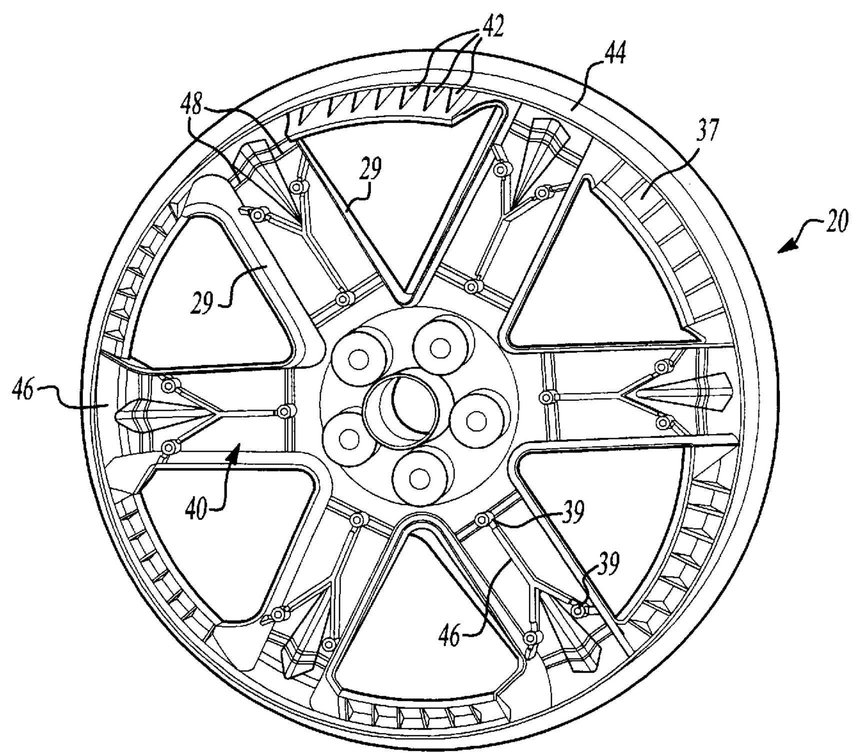
FIG. 2 is a perspective view of the inboard surface of the outboard unitary composite wheel rim constructed in accordance with the teachings of the preferred embodiment of the present invention.

Referring now to FIGS. 1 and 2, a perspective view of the outboard face 25 of the outboard composite rim 20 is shown. The outboard composite rim 20 includes a plurality of radial outer spoke sections 27. The outer spoke sections 27 connect to an outer hub portion 28 in the center of the outboard composite rim 20. An indented reinforcement section 31 is integrated in the outer portion of the outer spoke sections 27 for structural enhancement. The inboard side of outer spoke sections 27 include outer wall extensions 29 located on each side of the outer spoke sections 27, best shown in FIG. 2. The outer hub portion 28 includes an aperture 33 defining the centerpoint of the outboard composite rim 20. The outer hub portion 28 also includes a plurality of inset portions 32 with disk shaped end portions 34 defining an aperture 35 to receive a wheel stud (not shown). The disk shaped end portions 34 act as the mating surface for lug nuts (not shown). The outer spoke sections 27 extend radially outwardly from the outer hub portion 28 to circumferential wall portion 44. Intermediate to the outer spoke sections 27, flange sections 37 protrude inboard from the circumferential wall portion 44.

FIG. 2 shows the inboard face 40 of the outboard composite rim 20. The flange sections 37 include a plurality of support fins 42 offsetting the flange sections 37 at an inward angle of the circumferential wall portion 44. The outer spoke sections 27 include inner wall sections 46 lying substantially perpendicular to the inboard face 40 of the outboard composite rim 20. The inner surface of the outer spoke sections 27 include boss sections 39 adapted to receive fasteners 70 as shown and described herein with reference to FIG. 8. The boss sections 39 are connected by inner wall sections 46 providing structural support. Ridge portions 48 extend between the outer wall extensions 29 of the outer spoke sections 27.

Figure 3:
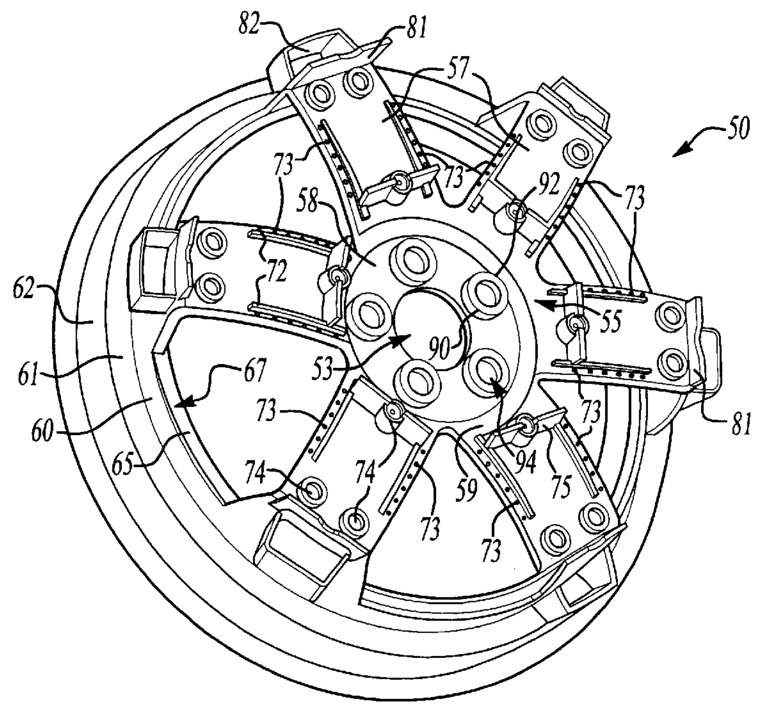
FIG. 3 is a perspective view of the outboard surface of the inboard unitary composite wheel rim constructed in accordance with the teachings of the preferred embodiment of the present invention.

FIG. 3 shows the outboard face 55 of the inboard composite rim 50. The inboard composite rim 50 includes a plurality of radial inner spoke sections 57. The inner spoke sections 57 are radially connected to an inner hub portion 58 in the center of the inboard composite rim 50 by an inwardly ramped section 59. The inner hub portion 58 includes a plurality of outset portions 90 with disk shaped end portions 92 defining an aperture 94 to receive a wheel stud (not shown). The inner hub portion 58 includes an aperture 53 defining the centerpoint of the inboard composite rim 50.

The inner spoke sections 57 are outwardly offset by wall extension portions 60 connecting the inner spoke sections 57 to a radial step portion 61 of the circumferential wall portion 62. The wall extension portions 60 of the inner spoke sections 57 include a ramped step portion 65. The face 67 of the ramped step portion 65 seats to the inboard face 40 of the circumferential wall portion 44 of the outboard composite rim 20 when the inboard composite rim 50 is mated with the outboard composite rim 20.

Figure 8:
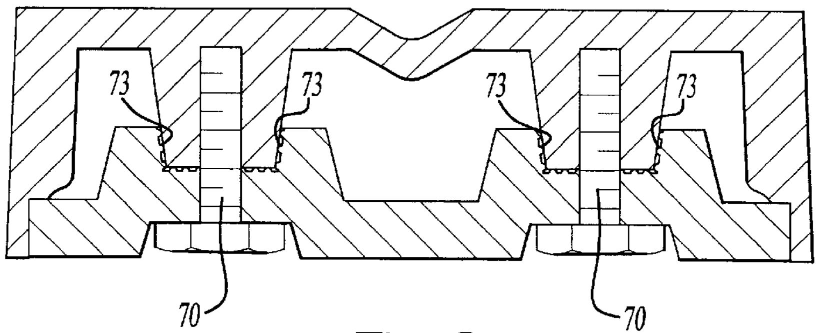
FIG. 8 is a cross sectional view of a spoke section taken along line 8—8 of FIG. 7 to illustrate a fastener interface in a spoke section.

The inner spoke sections 57 of the inboard composite rim 50 further include wall sections 72 that seat between the outer wall extensions 29 of the outer spoke sections 27 of the outboard composite rim 20 when the inboard composite rim 50 is mated with the outboard composite rim 20. The inner spoke sections 57 further include reception portions 74 which receive the boss sections 39 of the outboard composite rim 20 and together accept a fastener 70 as shown in FIG. 8 for securing the outboard composite rim 20 to the inboard composite rim 50. A wall portion 75 extends from the inboardmost reception portion 74 between the wall sections 72. An outer flange 81 projects outward from the outer portion of the inner spoke sections 57. Tab supports 82 extend in an outward direction from the wall extension portions 60.

The mating surface is defined by and an adhesive is applied to the outside of wall sections 72, up and around the wall portion 75 and around the inwardly ramped section 59. The adhesive is further applied to the tab supports 82, the reception portions 74 and the face 67 of the ramped step portion 65. Bead extrusions 73 line the mating surface of the outboard face 55 of the inboard composite rim 50 to ensure the adhesive will not overflow as the inboard composite rim 50 and outboard composite rim 20 are mated. It is apparent however, that the bead extrusions 73 may be located along the mating surface of the inboard face 40 of the outboard composite rim 20.

When the outboard composite rim 20 mates with the inboard composite rim 50, the face 67 of the ramped step portion 65 of the inboard composite rim 50 mates to the outside of the flange sections 37 of the outboard composite rim 20. Similarly, the tab supports 82 of the inboard composite rim 50 mate with the inner wall sections 46 of the outboard composite rim 20. The wall sections 72, outer flange portions 81, wall portion 75 and reception portions 74 of the inboard composite rim 50 mate with the outer wall extensions 29, ridge portions 48, the inboard face 40 and the boss sections 39 of the outboard composite rim 20 respectively. Accordingly, the inner hub portion 58 of the inboard composite rim 50 mates with the outer hub portion 28 of the outboard composite rim 20. An air tight fit results around the respective mating portions.

Figure 4:
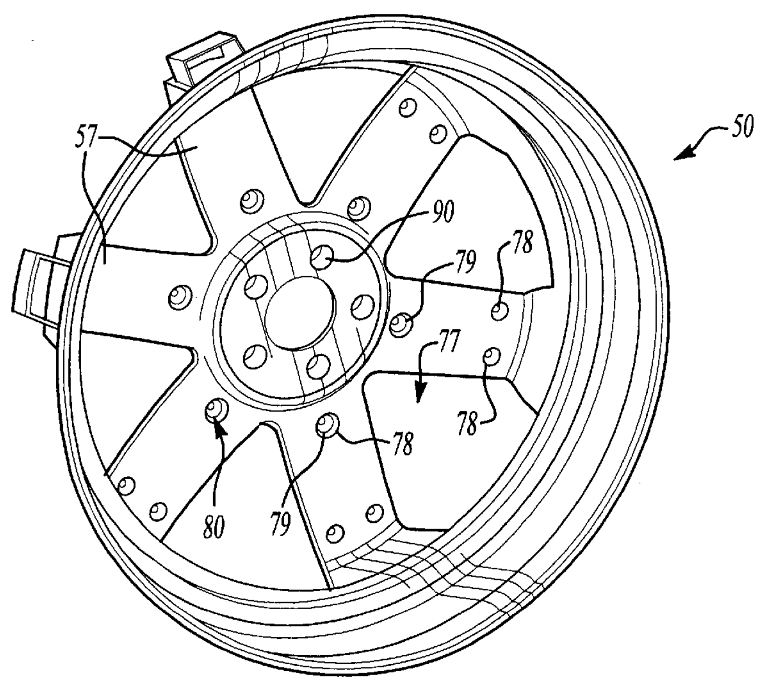
FIG. 4 is a perspective view of the inboard surface of the inboard unitary composite wheel rim constructed in accordance with the teachings of the preferred embodiment of the present invention.

FIG. 4 shows the inboard face 77 of the inboard composite rim 50. The inner spoke sections 57 of the inboard composite rim 50 include a plurality of inset portions 78 with disk shaped end portions 79 defining an aperture 80 to receive a fastener 70 as shown in FIG. 8.

Figure 6:
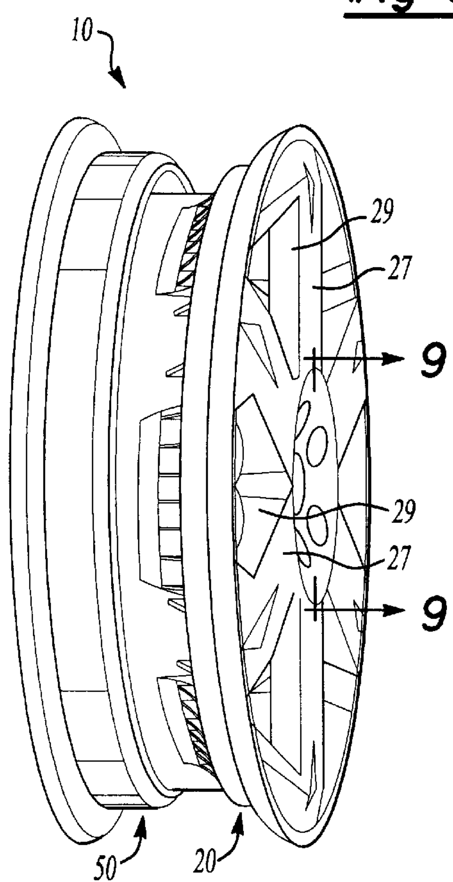
FIG. 6 is a perspective view of the inboard and outboard rims operatively engaged.

FIG. 5 illustrates the alignment of the inboard composite rim 50 and the outboard composite rim 20 prior to engagement. The spoke sections from the respective rims create box sections when joined. Specifically, the outer wall extensions 29 from the outboard composite rim 20 serve as the first parallel walls that lie substantially perpendicular to inner spoke sections 57 of the inboard composite rim 50 and outer spoke sections 27 of the outboard composite rim 20 which serve as the other parallel walls. FIG. 6 illustrates the inboard composite rim 50 engaged to the outboard composite rim 20. The inner spoke sections 57 of the inboard composite rim 50 align with the outer spoke sections 27 of the outboard composite rim 20 and the outer wall extensions 29 of the outboard composite rim 20 to form substantially box shaped spoke sections.

Figure 7:
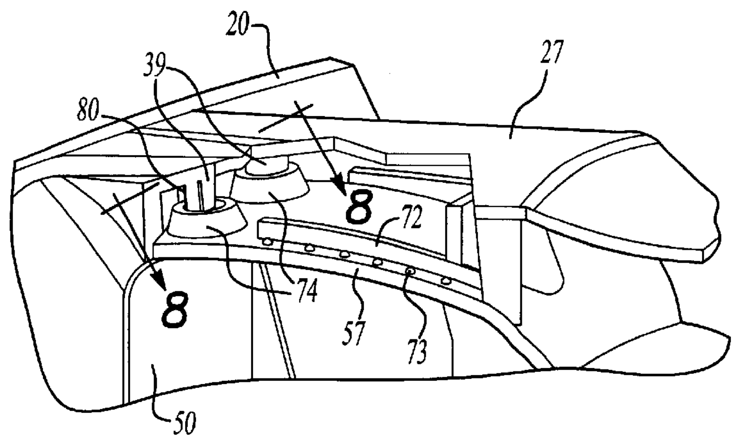
FIG. 7 is a perspective view of a spoke section with a cutaway of the outboard unitary composite wheel rim for purposes of illustrating the interior spoke fastening members.

FIG. 7 and 8 show the interface between inner spoke sections 57 of the inboard composite rim 50 and outer spoke sections 27 of the outboard composite rim 20. The boss sections 39 of the outer spoke sections 27 of the outboard composite rim 20 are received into the reception portions 74 of the inner spoke sections 57 of the inboard composite rim 50.

Figure 9:
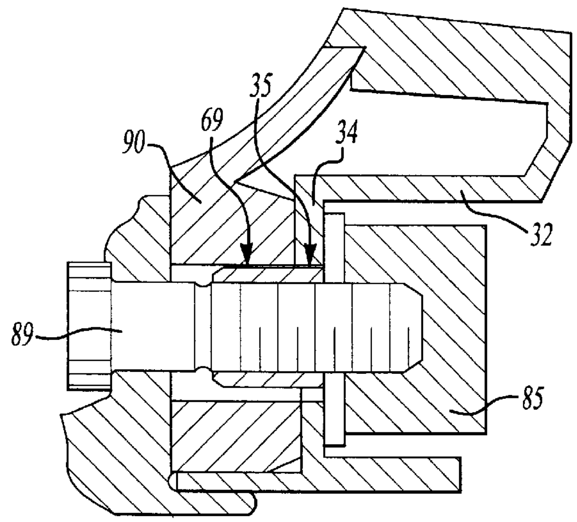
FIG. 9 is a cross sectional view of a lug nut area taken along line 9—9 of FIG. 6 shown to illustrate wheel stud, rim, lugnut interface.

FIG. 9 shows a lug nut 85 engaged with a wheel stud 89 extending through an aperture 69 of the inboard composite rim 50 and an aperture 35 of the outboard composite rim 20 which connects the wheel 10 to a vehicle (not shown).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A wheel for a motor vehicle comprising an outboard unitary composite wheel rim defining an inboard oriented engagement surface, said inboard oriented engagement surface defining a first plurality of spoke sections;

an inboard unitary composite wheel rim defining an outboard oriented engagement surface adapted to engage said inboard oriented engagement surface of said outboard unitary composite wheel rim, said outboard oriented engagement surface defining a second plurality of spoke sections wherein the second plurality of spoke sections are outwardly offset with respect to a plane defined by the inboard unitary composite wheel rim;

each of the first spoke sections engaging a corresponding one of the second spoke sections, each of the first spoke sections and its corresponding second spoke section having opposed sidewalls and opposed endwalls extending therebetween with at least one box section defined by each of the first spoke sections and its corresponding second spoke section and the opposed sidewalls and opposed endwalls extending between each of the first spoke sections and its corresponding second spoke section.

2. The wheel of claim 1 wherein said first plurality of spoke sections connect to an inner hub portion, said hub portion includes a plurality of apertures.

3. The wheel of claim 1 wherein said second plurality of spoke sections connect to an inner hub portion, said hub portion includes a plurality of apertures.

4. The wheel of claim 1 wherein said engagement surfaces are conformed for interlocking engagement with each other.

5. The wheel of claim 4 wherein said first plurality of spoke sections include said opposed sidewalls and said second plurality of spoke sections include said opposed endwalls.

6. The wheel of claim 5 wherein said first and second plurality of spoke sections further comprise a plurality of fasteners operative to connect said first and second plurality of spoke sections.

7. The wheel of claim 6 wherein said engagement surfaces are adhesively bonded together.

8. The wheel of claim 1, wherein at least one of said outboard unitary composite wheel rim and said inboard unitary composite wheel rim include a structural fiber material integrally molded therein.

9. The wheel of claim 8 wherein said structural fiber material is preformed.

10. The wheel of claim 1 wherein the box sections formed by the engagement of said first and second plurality of spoke sections are fully outboard offset in relation to the plane defined by the inboard unitary composite wheel rim.

11. A structurally reinforced plastic wheel for a motor vehicle comprising:

an inboard rim portion including a reinforcing component disposed within said inboard rim portion, said reinforcing component including a structural fiber material integrally molded into said inboard rim portion, said inboard rim portion defining an outwardly offset outboard mating surface;

an outboard rim portion including a reinforcing component disposed within said outboard rim, said reinforcing component including a structural fiber material integrally molded into said outboard rim portion, said outboard rim portion defining an inboard mating surface;

said inboard rim portion interconnects to said outboard rim portion;

said inboard and outboard mating surfaces engage defining a plurality of outboard offset spoke sections wherein the outboard offset spoke sections are outboard offset with respect to a plane defined by the inboard rim portion, each of said spoke sections having opposed sidewalls and opposed endwalls extending between said inboard and outboard mating surfaces defining at least one box section.

12. The structurally reinforced plastic wheel of claim 11 wherein said mating surfaces of said inboard rim portion and said outboard rim portion are adhesively bonded together.

13. The structurally reinforced plastic wheel of claim 11 wherein said plurality of spoke sections are held together by a plurality of fasteners disposed therein.

14. The structurally reinforced plastic wheel of claim 11 wherein said structural fiber material includes carbon fibers.

15. The structurally reinforced plastic wheel of claim 11 wherein said structural material includes fiberglass.

16. The structurally reinforced plastic wheel of claim 11 wherein said structural fiber material is a loose fiber configuration.

17. The structurally reinforced plastic wheel of claim 11 wherein said structural fiber material includes a screen-like, woven material.

18. The structurally reinforced plastic wheel of claim 17 wherein said structural fiber material is preformed.

19. The plastic wheel of claim 11 wherein said outwardly offset inboard mating surface and said outboard mating surface are fully outboard offset so that said outboard offset spoke sections are fully outboard offset with respect to the plane defined by the inboard rim portion.

20. A plastic wheel for a motor vehicle comprising:

an inboard rim portion, said inboard rim portion defining an outwardly offset outboard mating surface;

an outboard rim portion, said outboard rim portion defining an inboard mating surface;

said inboard and outboard rim portions molded of plastic including a reinforcing component; and said inboard and outboard mating surfaces engage defining a plurality of outboard offset spoke sections wherein the outboard offset spoke sections are outboard offset with respect to a plane defined by the inboard rim portion, each of said spoke sections having opposed sidewalls and opposed endwalls extending between said inboard and outboard mating surfaces defining at least one box section.

21. The plastic wheel according to claim 20 wherein said reinforcing component includes carbon fibers.

22. The plastic wheel according to claim 20 wherein said reinforcing component includes fiberglass.

23. The plastic wheel according to claim 20 wherein said reinforcing component includes a loose fiber configuration.

24. The plastic wheel according to claim 20 wherein said reinforcing component includes a preformed fiber matrix.

25. The plastic wheel of claim 20 wherein said outwardly offset inboard mating surface and said outboard mating surface are fully outboard offset so that said outboard offset spoke sections are fully outboard offset with respect to the plane defined by the inboard rim portion.

* * * * *